(12) United States Patent
Werner (10) Patent No.: US 6,906,687 B2
(45) Date of Patent: Jun. 14, 2005

(54) DIGITAL FORMATTER FOR 3-DIMENSIONAL DISPLAY APPLICATIONS

(75) Inventor: William B. Werner, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 361 days.

(21) Appl. No.: 09/919,448

(22) Filed: Jul. 31, 2001

(65) Prior Publication Data

US 2002/0021261 A1 Feb. 21, 2002

Related U.S. Application Data

(60) Provisional application No. 60/221,723, filed on Jul. 31, 2000.

(51) Int. Cl.$^7$ .............................. G09G 5/00; H04N 9/47
(52) U.S. Cl. ............................................. 345/8; 348/53
(58) Field of Search ..................... 345/6–9, 545–550, 345/3.2; 348/51–60, 446, 448, 455, 459

(56) References Cited

U.S. PATENT DOCUMENTS

| | | | | |
|---|---|---|---|---|
| 4,562,463 A | * | 12/1985 | Lipton | ........................ 348/56 |
| 5,083,851 A | * | 1/1992 | MacDonald | ................ 359/462 |
| 5,508,750 A | * | 4/1996 | Hewlett et al. | ............. 348/558 |
| 5,701,154 A | * | 12/1997 | Dasso | ......................... 348/42 |
| 5,870,137 A | * | 2/1999 | Stuettler | ...................... 348/51 |
| 6,222,589 B1 | * | 4/2001 | Faroudja et al. | ............ 348/448 |
| 2003/0020809 A1 | * | 1/2003 | Gibbon et al. | ................ 348/51 |

* cited by examiner

*Primary Examiner*—Alexander Eisen
(74) *Attorney, Agent, or Firm*—Charles A. Brill; Wade James Brady, III; Frederick J. Telecky, Jr.

(57) ABSTRACT

A 3-D digital projection display 60 that uses a quadruple memory buffer 63–66 to store and read processed video data for both right-eye and left-eye display. Video data is processed at a 48-frame/sec rate and readout twice (repeated) to provide a flash rate of 96 (up to 120) frames/sec, which is above the display flicker threshold. Data is synchronized with a headset or goggles with the right-eye and left-eye frames being precisely out-of-phase to produce a perceived 3-D image.

26 Claims, 8 Drawing Sheets

DIGITAL FORMATTER FOR 3-DIMENSIONAL DISPLAY APPLICATIONS

This application claims priority under 35 USC § 119(e)(1) of provisional application No. 60/221,723 filed Jul. 31, 2000.

BACKGROUND OF THE INVENTION

1. Field of the Invention

The present invention relates to 3-dimensional (3-D) video displays and particularly to the digital formatters used in such displays.

2. Description of the Related Art

Figure 1:
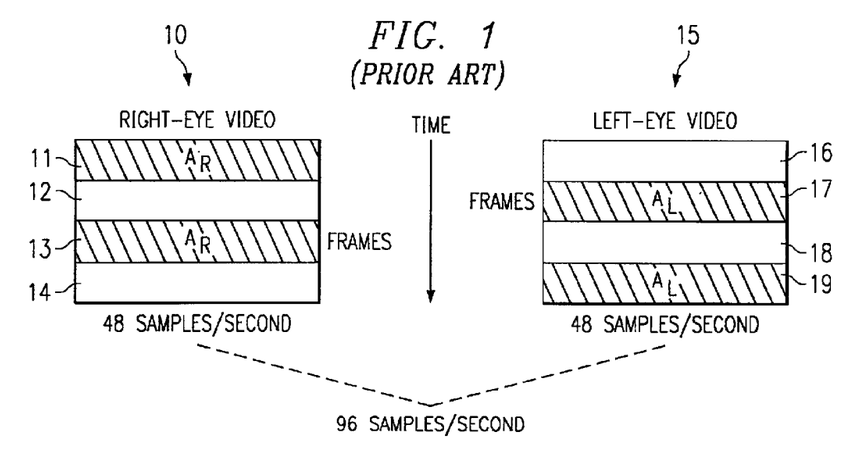
FIG. 1 is a diagram showing how a 3-dimensional projection display system, consisting of two 2-dimensional projectors synchronized to be out-of-phase, is read out. (prior art)

3-D display applications using a sequential left-eye, right-eye technique require a high frame rate, usually on the order of 96–120 frames/sec, to avoid objectionable flicker. This rate is accomplished in some 3-D film projection systems using two synchronized film projectors, one with left-eye information and the other with right-eye information, each running at a 24-frame/sec temporal rate, but at a 48-frame/sec display (flash) rate. A correspondingly synchronized viewing device, typically a shutter device such as a visor, helmet, or goggles is worn by the viewer. The viewer-worn shutter device shutters the left-eye and right-eye such that a 3-D image is perceived. The viewer device can also be various forms of polarized elements that allow light of a unique polarization to pass to each eye. As shown in FIG. 1, for the right-eye data frame 10 and left-eye data frame 15, a shutter is opened twice per film frame with a 50% duty cycle, allowing the two projectors to run precisely out of phase. That is, when the right-eye frame $A_R$ 11 is displayed, the corresponding left-eye frame 16 is shuttered OFF and when the left-eye frame $A_L$ 17 is displayed, the corresponding right-eye frame 12 is shuttered OFF. The display of frames $A_R$ and $A_L$ are then repeated as frames $A_R$ 13 and $A_L$ 19, respectively. Again, when right-eye frame $A_R$ 13 is displayed, the corresponding left-eye frame 18 is shuttered OFF, and when left-eye frame $A_L$ 19 is displayed, the corresponding right-eye frame 14 is shuttered OFF. This effect can also be produced by differently polarized light used for the left and right projection combined with polarized viewing equipment. Using this technique, frames are processed at a temporal rate of 24-frames/sec and displayed twice per frame to provide a flash rate of 48-frames/sec for each eye or an effective overall 3-D display flash rate of 96-frames/sec for both eyes.

Figure 2:
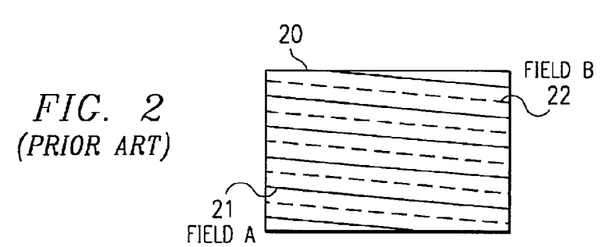
FIG. 2 is a diagram illustrating the 2:1 interleaved interlace technique used with 60-field/sec video. (prior art)

Modern digital projection display systems provide flicker-free performance operating at 30 frames/sec (60-fields/sec, interlaced) rates, as illustrated in FIG. 2. Here, the frame 20 consists of interleaved Field A 21 and Field B 22, each occurring at a 60-field/sec rate. This means that each frame of 30 frame/sec data is flashed on to the screen in interleaved half fields at 60 fields/sec. Other displays, such as Digital Micromirror Device (DMD) projections displays, operate at 60 progressive (non-interlaced) frames/sec rates where every line is displayed in every frame. However, in order to avoid flicker and maintain a perceived fusion of motion, a 3-D version of such a projection display requires display rates of up to 120-frames/sec (twice the normal rate) due to the sequential left-eye, right-eye technique involved.

Figure 3:
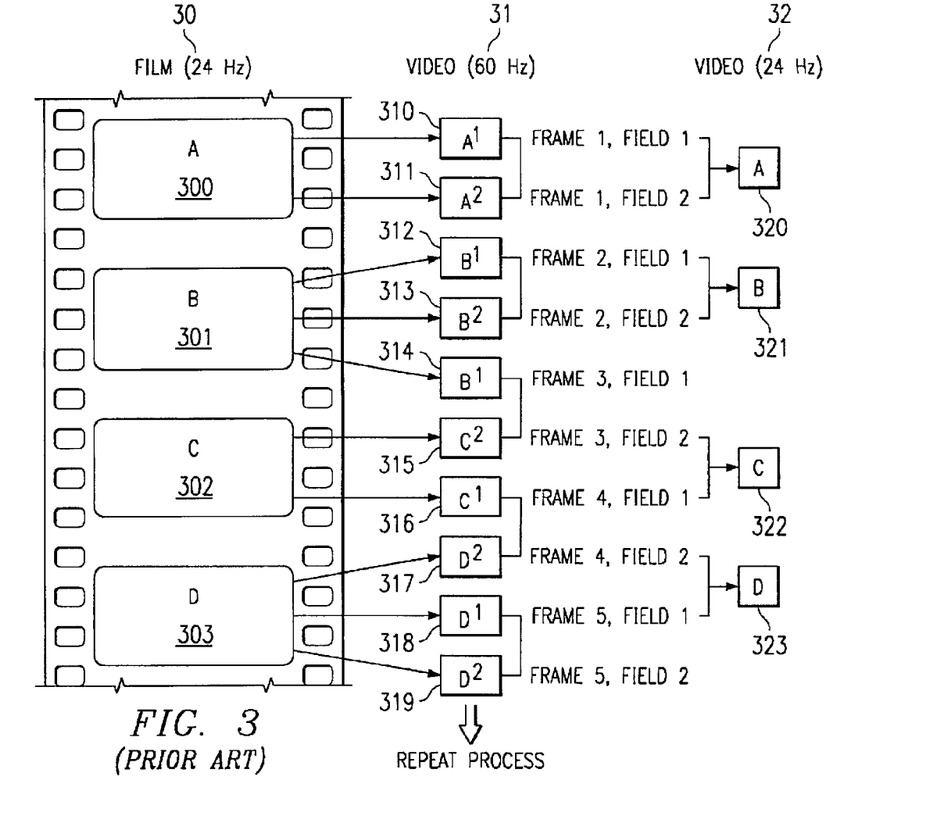
FIG. 3 is a diagram illustrating the data format for converting 24-frame/sec film data to 60 field/sec interlaced video and then to 24-frame/sec progressive video. (prior art)

FIG. 3 shows the format that is typically used when displaying 24-frame/sec film (cinema type) media on a 2-D digital projection display. The 24-frame/sec film data 30 is converted to 60 field/sec video 31 using a 3:2 pull-down technique as discussed in the referenced patent application (No. TI-26774). Every other frame of 24-frame/sec film data 30 is broken into two or three 60 field/sec interlaced video data fields 31, respectively. That is, film frames A 300 and C 302 are converted to two video fields $A^1$ 310, $A^2$ 311 and $C^2$ 315, $C^1$ 316 while film frames B 301 and D 303 are converted to video fields $B^1$ 312, $B^2$ 313, $B^1$ 314, and $D^2$ 317, $D^1$ 318, $D^2$ 319, respectively. The process then repeats over and over for every four frames of film data 30.

The extra field in every other frame can present artifacts in the projected video. This can be overcome by converting the 60-field/sec interlaced video 31 to 24-frame/sec progressive (non-interlaced) video 32. This is accomplished by discarding one of each extra fields of interlaced video, $B^1$ 312 or $B^1$ 314 and $D^2$ 317 or $D^2$ 319; e.g., selecting $A^1$ 310 (frame 1, field 1) and $A^2$ 311 (frame 1, field 2) as progressive video frame A 320, $B^1$ 312 (frame 2, field 1) and $B^2$ 313 (frame 2, field 2), while discarding the data for $B^1$ 314 (frame 3, field 1), as progressive video frame B 321, $C^2$ 315 (frame 3, field 2) and $C^1$ 316 (frame 4, field 1) as progressive video frame C 322, and finally $D^2$ 317 (frame 4, field 2) and $D^1$ 318 (frame 5, field 1), while discarding the data for $D^2$ 319 (frame 5, field 2), as progressive video frame D 323. This data format, resulting in 24-frames/sec of progressive video, can be used in each eye of a 3-dimensional digital projection display to provide video that is free of 3:2 pull-down artifacts.

Figure 4:
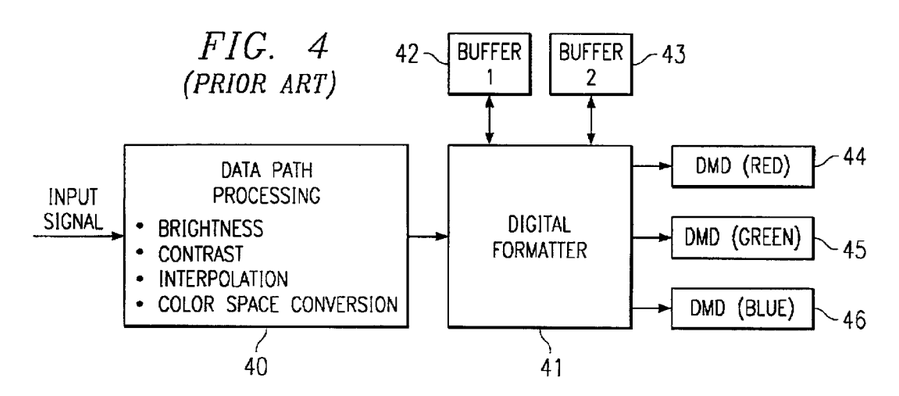
FIG. 4 is a block diagram for a 2-D DLP projection display with three DMDs. (prior art)

FIG. 4 is a block diagram showing how video data is handled in a 2-D digital projection display, such as a Digital Light Processor (DLP™) projector. The system consists of data processing circuitry 40, which takes the video input signal and performs such functions as correction for brightness, contrast, chroma interpolation, and color space conversion, a digital formatter 41, two memory buffers 42–43, and in this case three Digital Micromirror Devices (DMDs) 44–46. In operation, while video data from one of the memory buffers 42 or 43 is being presented to the three DMDs for display, the next frame of processed video data is being loaded into the other memory buffer 43 or 42, respectively. As a result, the next frame of video data is always being prepared while the present frame is being displayed. As pointed out in the discussion of FIG. 1, a digital 3-D display will require display rates of 96–120 fields/sec to avoid flicker, but because each frame of video is flashed twice per frame (repeated), the process rate of the data need only be 48–60 fields/sec.

The earlier invention disclosed and claimed in U.S. patent application Ser. No. 09/154,461 entitled "Artifact Elimination for Spatial Light Modulator Displays of Data Converted from Film Format" is relevant as background information to the current invention.

There is a recognized need for a 3-D display, which can handle the bandwidth (frame rate) requirements discussed above at an affordable price and still provide high-performance video. The invention disclosed herein addresses this need in terms of both a method and an apparatus.

SUMMARY OF THE INVENTION

This invention discloses the method and apparatus for a high-performance digital light processing (DLP) 3-D display, which has video display rates of up to 120 fields/sec while requiring data processing rates of up to only 48–60 fields/sec. This approach uses quadruple buffering of the DLP formatter frame memory.

In the 3-D display of this invention, two double buffers (quadruple memory) are used, one for the right-eye video data and one for the left-eye video. In a display formatter, a double-buffered memory is used to store both the frame being displayed and the frame being processed. This method requires essentially twice the memory but only half the bandwidth. As the cost of memory continues to decrease, this is an excellent tradeoff to achieve high performance 3-D displays. Also, this technique reduces by 50% the amount of playback media (data) read into the system, which means that twice the amount of data can be put on to the playback tape or other storage device.

The invention also discloses the case for playing back both 60 field/sec interlaced and 24-frame/sec progressive video. For 60-field/sec interlaced video, a reverse 3:2 pull-down multiplexer is used to provide 48-frame/sec, progressive data to the projector. In the case of the 24-frame/sec progressive video, the 24-frame/sec data from both the right-eye and left-eye are simply multiplexed to supply 48-frame/sec, progressive data to the projector.

DETAILED DESCRIPTION

This invention discloses a method and apparatus for a 3-D digital projection display. The projector uses a quadruple memory buffer to store and read processed video data for both the right-eye and left-eye display. Video data can be processed at a rate of 30–60 frames/sec, which is within the bandwidth requirements of typical 2-D displays of this type, and displayed with a flash rate of 60–120 frames/sec.

Figure 5:
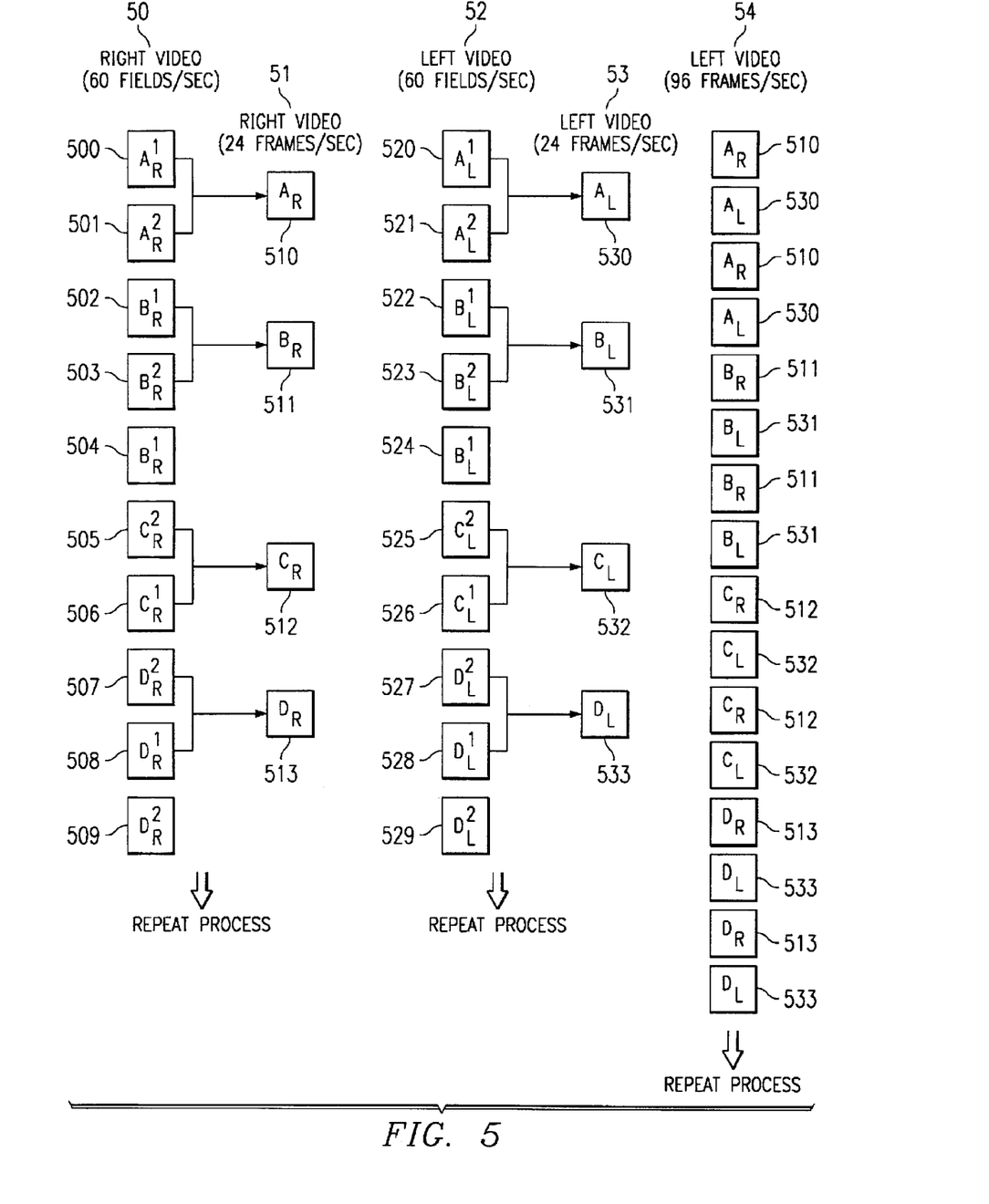
FIG. 5 is a diagram showing the data format for the 3:2 pull-down multiplexer in a 3-D DLP projection display.

The diagram of FIG. 5 shows the video data format for the 3-D digital projection display of this invention. Right-eye video 50 and left-eye video 52, at 60 interlaced fields/sec, is converted to progressive 24-frame/sec video for both right-eye 51 and left-eye 53, respectively. The data is then combined to provide 96-frames/sec video 54 by sequentially reading and then repeating again each frame of right-eye 51 and left-eye 53 data. The method used for converting the data for each eye is that described earlier in FIG. 3. The method of this invention takes the 24-frame/sec data from each eye and sequentially combines it at 48-frames/sec and then repeats it again to provide 96-frames/sec video. The process uses a reverse 3:2 pull-down technique to convert the right-eye interlaced 60 field/sec frame A field 1 $A^1_R$ 500 and field 2 $A^2_R$ 501, frame B field 1 $B^1_R$ 502 and field 2 $B^2_R$ 503, frame C field 2 $C^2_R$ 505 and field 1 $C^1_R$ 506, and frame D field 2 $D^2_R$ 507 and field 1 $D^1_R$ 508 into right-eye, 24-frames/sec progressive video $A_R$ 510, $B_R$ 511, $C_R$ 512, and $D_R$ 513. Right-eye fields $B^1_R$ 504 and $D^2_R$ 509 are referred to as redundant fields and the data from these are discarded and not used in this process. Alternately, frame B field 1 $B^1_R$ 504 and frame D field 2 $D^2_R$ 509 could be selected, thereby making frame B field 1 $B^1_R$ 502 and frame D field 2 $D^2_R$ 507, respectively, the redundant fields. The same process is used to convert the left-eye interlaced 60 field/sec frame A field 1 $A^1_L$ 520 and field 2 $A^2_L$ 521, frame B field 1 $B^1_L$ 522 and field 2 $B^2_L$ 523, frame C field 2 $C^2_L$ 525 and field 1 $C^1_L$ 526, and frame D field 2 $D^2_L$ 527 and field 1 $D^1_L$ 528 into left-eye, 24-frames/sec progressive video $A_L$ 530, $B_L$ 531, $C_L$ 532, and $D_L$ 533. Left-eye fields $B^1_L$ 524 and $D^2_L$ 529 are also redundant fields and the data from these are discarded and not used in this process. As before, frame B field 1 $B^1_L$ 524 and frame D field 2 $D^2_L$ 529 could be selected, thereby making frame B field 1 $B^1_L$ 522 and frame D field 2 $D^2_L$ 527, respectively, the redundant fields. Finally, the 24-frame/sec right-eye 51 and left-eye 53 data is sequentially combined and repeated to provide 96-frame/sec progressive video 54. This whole sequence is then repeated over and over to provide the 3-D video data stream.

Figure 6:
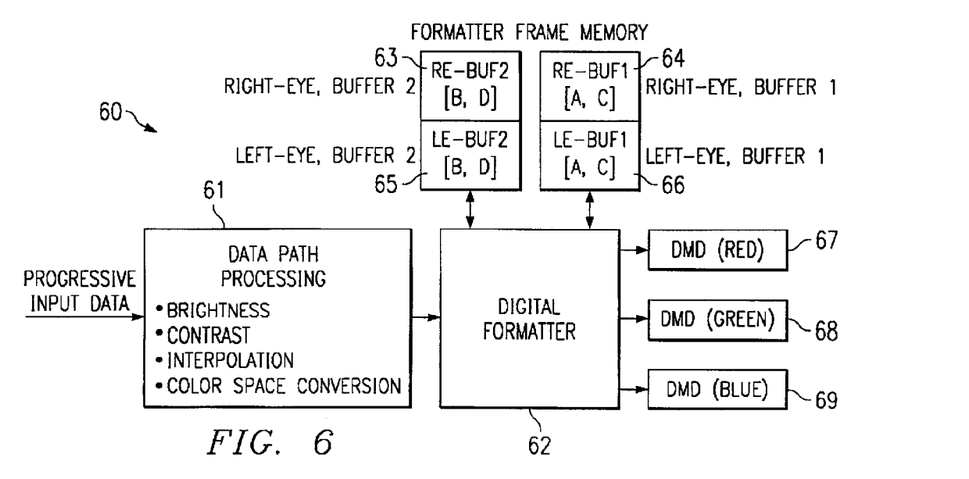
FIG. 6 is a block diagram for the 3-D digital projection display of this invention.

FIG. 6 is a block diagram 60 for the 3-D projection display of this invention. The system consists of data processing circuitry 61, which takes the video input signal and performs such functions as correction for brightness, contrast, chroma interpolation, and color space conversion, a digital formatter 62, four memory buffers 63–66, and three digital micromirror devices (DMDs) 67–69. In this case, the memory buffers have been expanded from the two buffers typically used in a 2-D projection display to four buffers 63–66 for the 3-D display. There are two double-buffers 63,65 and 64,66, which are used to alternately store and display processed data; e.g., each double-buffer 63,65 or 64,66 contains the right-eye and left-eye data, respectively. Progressive input data is supplied to be processed by the data path-processing block 61. In operation, while right-eye and left-eye data for frame A is being displayed from buffer 64 and buffer 66, respectively, processed right-eye and left-eye data for field B are stored in buffer 63 and buffer 65, respectively. By doubling the memory buffer in this method, video can be displayed at flash rates of up to 120-frames/sec, which is twice the normal rate, to present a flicker-free 3-D picture.

Figure 7:
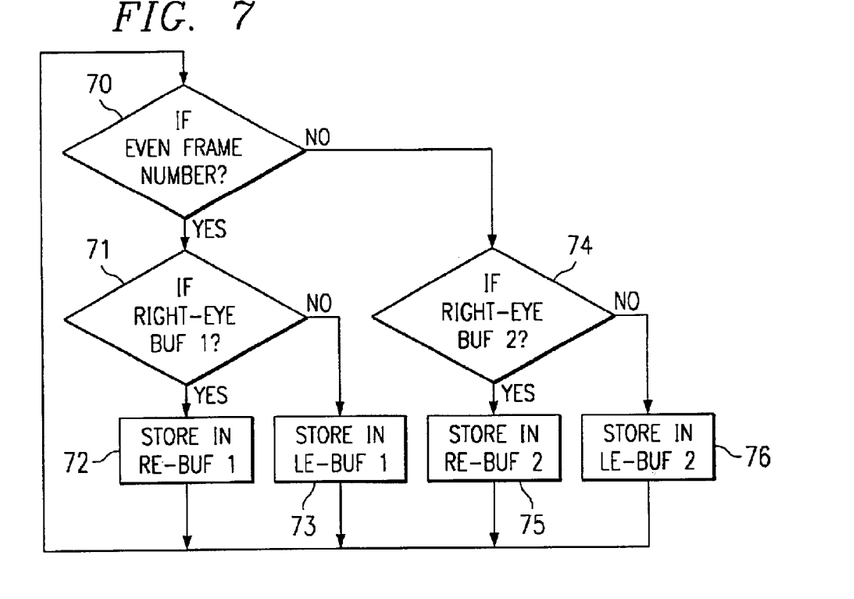
FIG. 7 is a flowchart for storing the video data in the formatter memory of the 3-D DLP projection display of FIG. 6.

FIG. 7 is a flowchart showing how data is loaded into the four formatter memory buffers 63–66 of FIG. 6. The even-odd frame decision block 70 determines if the processed data is from an even numbered frame of the progressive 48-frame/sec video. If YES (it is from an even frame), then the buffer 1 right-eye decision block 71 determines if it is right-eye video. If YES (it is right-eye video), then the data is stored in the right-eye buffer 1 (RE-BUF 1) 72 and if NO (it is not right-eye video), the data is stored in the left-eye buffer 1 (LE-BUF 1) 73 and then in either case the buffer loading cycle repeats. On the other hand, if the even frame decision block 70 decision is NO (it is not from an even frame), then the buffer 2 right-eye decision block 74 determines if it is right-eye video. If YES (it is right-eye video), then the data is stored in the right-eye buffer 2 (RE-BUF 2) 75 and if NO (it is not right-eye video), the data is stored in left-eye buffer 2 (LE-BUF 2) 76 and then in either case the buffer loading cycle repeats.

Figure 8:
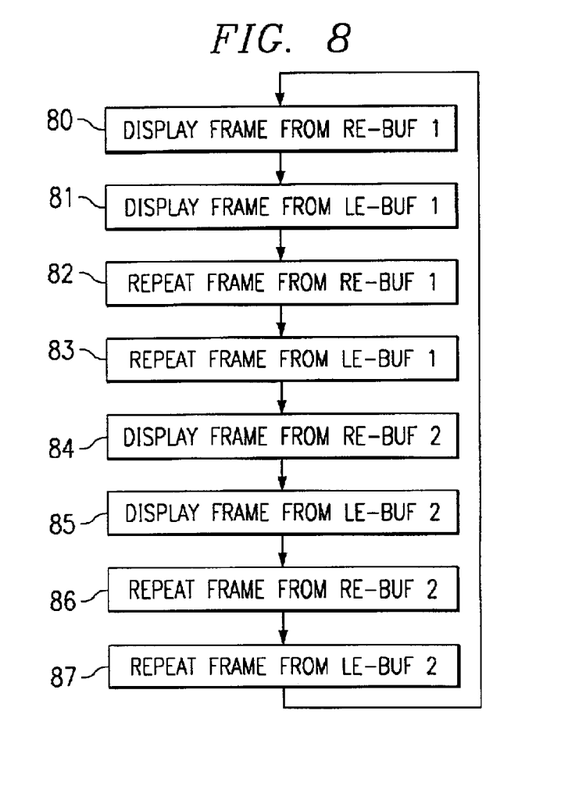
FIG. 8 is a flowchart for reading out and displaying the video data from the formatter memory of the 3-D DLP projection display of FIG. 6.

FIG. 8 is a flowchart showing how data is read out and displayed from the four formatter memory buffers 63–66 of FIG. 6. Data from each buffer is displayed on the screen twice for each eye with the right-eye and left-eye data being 180° out of phase, so that while data is displayed to one eye, the other eye is blacked out by a visor or similar device. As discussed earlier, while data from one buffer are being displayed, processed data is being stored in the other buffer. Frames of data are sequentially read from buffers RE-BUF1 80 and LE-BUF1 81, repeated from these buffers RE-BUF1 82 and LE-BUF1 83, and then read from buffers RE-BUF2 84 and LE-BUF2 85, and repeated from these buffers RE-BUF2 86 and LE-BUF2 87. This readout sequence is then repeated over and over. Although the data is processed at 24-frames/sec for each eye and each buffer is displayed on the screen at 48-frames/sec, the combining of the right-eye/left-eye video increases the effective display rate to 96-frames/sec.

Figure 9:
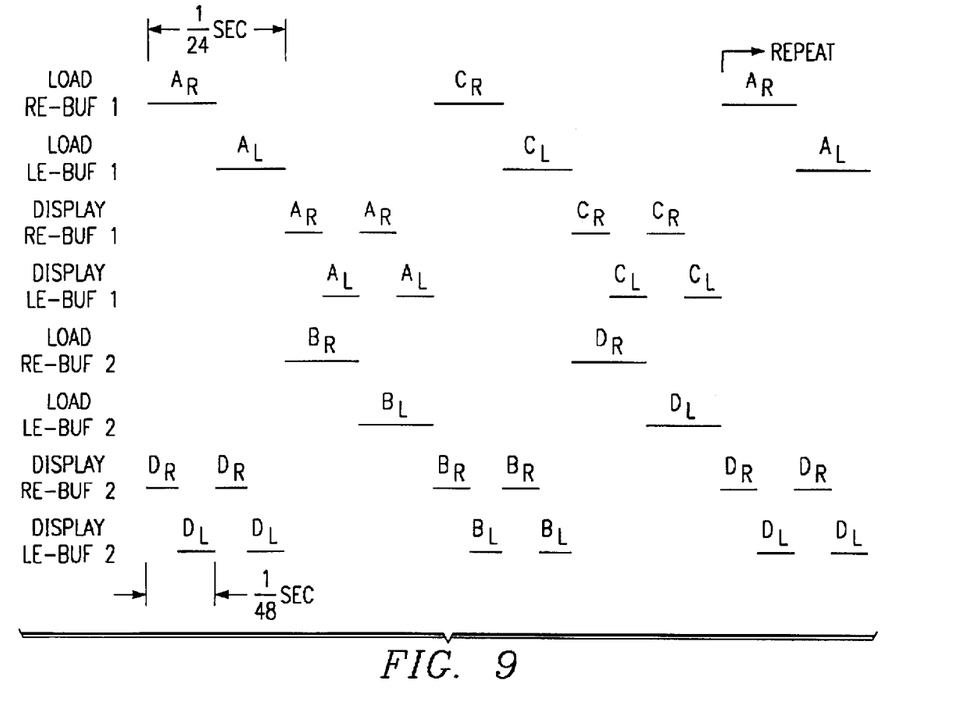
FIG. 9 is a timing diagram for loading and displaying video data from the formatter memory of the 3-D DLP projection display of FIG. 6.

FIG. 9 is a timing diagram for loading and displaying data from the formatter memory buffers 63–66 of FIG. 6. This illustrates how one of the right-eye or left-eye frame buffers gets loaded in 1/48 sec (for example RE-BUF1 64 with right-eye frame A data) so that a frame of right-eye/left-eye data is loaded into the buffers in 1/24 sec (for example RE-BUF1 and LE-BUF1). Data is then readout from the buffers and displayed twice for each frame in 1/24 sec (equivalent of displaying data from each eye in 1/96 sec). This diagram also illustrates that while data is being processed and stored in one buffer (example $C_R/C_L$) it is being displayed twice from the other buffer (example $B_R/B_L$) in the same period of time.

Figure 10:
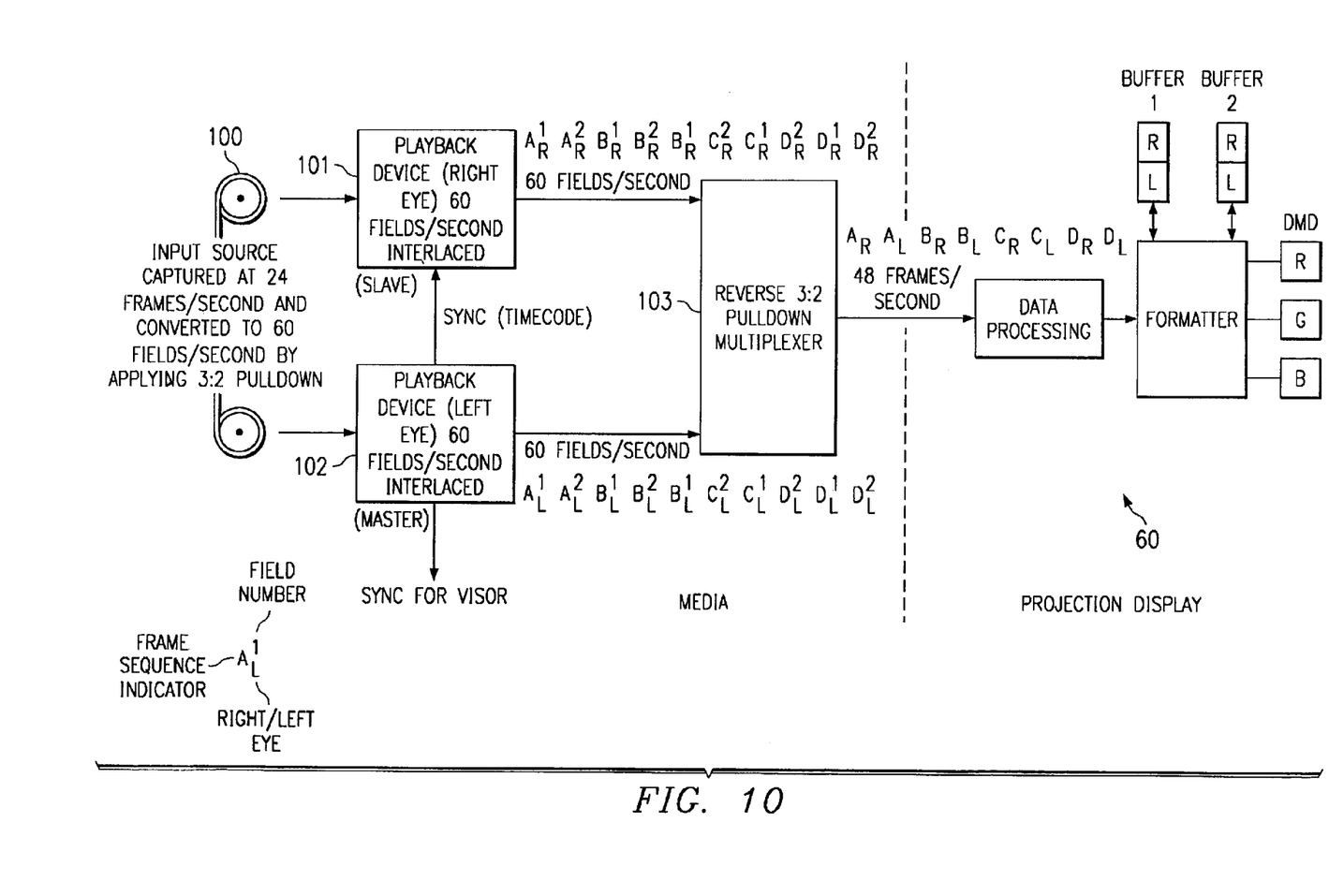
FIG. 10 is a diagram showing the data format for playing back (displaying) data, which has been captured at 24-frames/sec and converted to 60 field/sec interlaced video.

Playback source data is often captured at 24-frames/sec and converted to 60 fields/sec by applying a 3:2 pull-down technique. FIG. 10 is a block diagram illustrating the sequence for the playback of data, such as film 100 (media), which has been captured off-line at 24-frames/sec and converted to 60 interlaced fields/sec by applying a 3:2 pull-down technique. The original data is recorded from two sources, such as cameras, located in space such as to represent the right and left eyes, respectively. The captured data 100 is fed into right-eye 101 and left-eye 102 playback devices. The sequence of the right-eye playback device 101, still at 60 fields/sec, is $A^1_R A^2_R B^1_R B^2_R B^1_R C^2_R C^1_R D^2_R D^1_R D^2_R$ and of the left-eye playback device 102

$A^1_L A^2_L B^1_L B^2_L B^1_L C^2_L C^1_L D^2_L D^1_L D^2_L$.

These two outputs signals are fed into the field buffers of the reverse 3:2 pull-down multiplexer 103 where field 1 and field 2 are interleaved, the right-eye and left-eye data is multiplexed, and the redundant fields are removed to provide 48-frames/sec progressive video with the following data sequence:

$A_R A_L B_R B_L C_R C_L D_R D_L$.

The data is then provided to the projection display 60 (discussed earlier in FIG. 6) for display.

Figure 11:
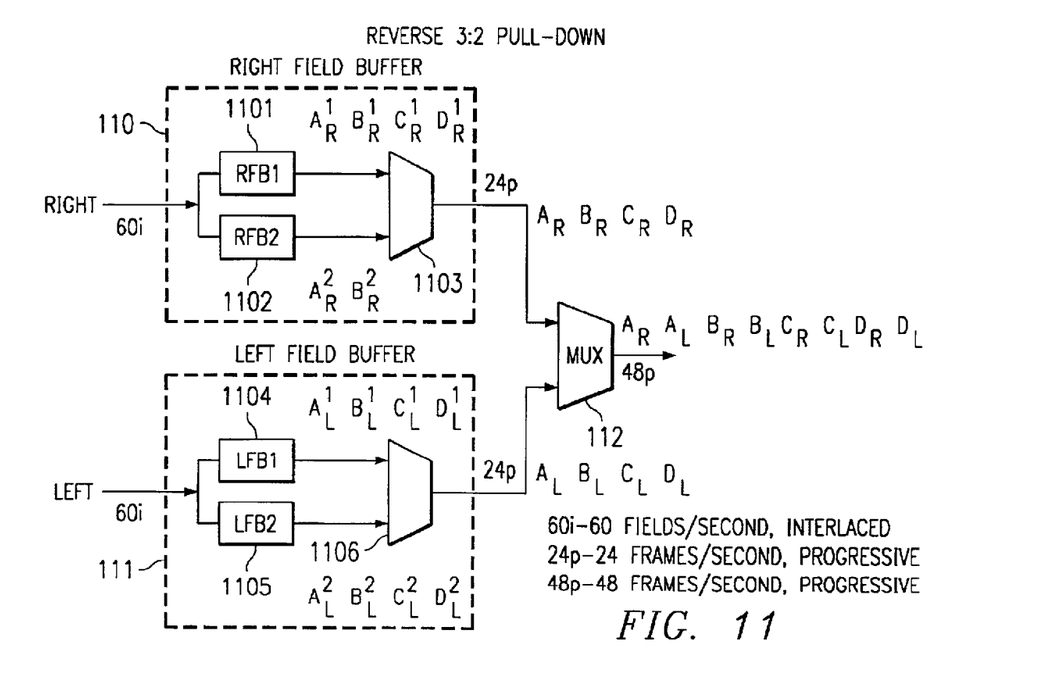
FIG. 11 is a block diagram for the reverse 3:2 pull-down multiplexer used in the data conversion technique shown in FIG. 10.

FIG. 11 is a block diagram for the internal workings of the reverse 3:2 pull-down multiplexer 103 shown in FIG. 10. This circuitry is comprised of right field and left field buffers 110,111 and a multiplexer (MUX) 112, and is used to convert the 60-field/sec interlaced video from the playback devices 101,102 into 48-frame/sec progressive data. The two field buffers 110, 111 consist of first-in/first-out (FIFO) field 1 buffers RFB1 1101, LFB1 1104 and field 2 buffers RFB2 1102, LFB2 1105 and multiplexers 1103,1106 to handle the right and left field data, respectively. Although the output data rate of each 3:2 pull-down frame buffer 110,111 is 24 progressive frames/sec, each frame buffer output is displayed in 1/48 th sec so as to interleave with the other frame buffer output. The output of the right field buffer 110 is the 24-frame/sec progressive signal $A_R B_R C_R D_R$, and the output of the left field buffer 111 is the 24-frame/sec progressive signal $A_L B_L C_L D_L$ These two 24-frame/sec progressive signals, originating from the right-eye and left-eye playback devices 101,102, respectively, are then combined in a ping-pong fashion by multiplexer 112 to provide the 48-frame/sec progressive signal $A_R A_L B_R B_L C_R C_L D_R D_L$ to the projection display.

Figure 12:
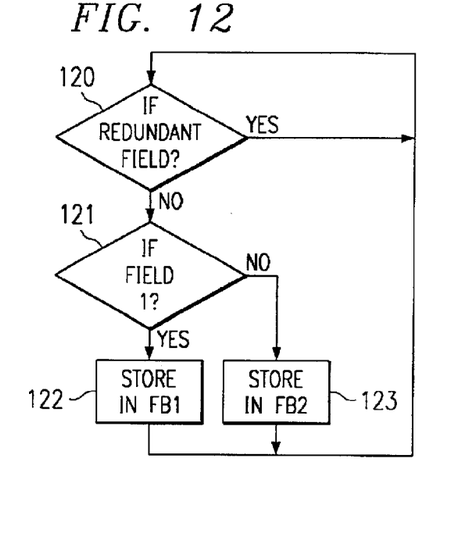
FIG. 12 is a flowchart showing how video data is loaded into the FIFO field buffers of the reverse 3:2 pull-down multiplexer of FIG. 10.

FIG. 12 is a flowchart showing how right-eye and left-eye data is stored in the field buffers 110,111 of the reverse 3:2 pull-down multiplexer 103. Both the right and left field buffers 110 and 111 process data in parallel so that this flowchart applies to both. First, decision block 120 determines if the data is from a redundant field. If YES (it is from a redundant field), the data is discarded and the cycle repeats. If NO (it is not from a redundant field), then the decision block 121 determines if this is field 1 data. If YES (it is field 1 data), then the data is stored in the field 1 FIFO buffer 122 (example, RFB1) and the cycle repeats. If NO (it is not field 1 data), the data is stored in the field 2 FIFO buffer 123 (example, RFB2) and the cycle repeats. This process places the video field data in buffers RFB1 1101 and RFB2 1102 for right-eye data and in buffers LFB1 1104 and LFB2 1105 for left-eye data. Notice that the sequence of fields for the data at the input of the field buffers 110,111 changes in midstream; i.e., for example, in the case of the right-eye it is field 1, field 2, field 1, field 2, and then field 2, field 1, field 2, field 1, as follows $A^1_R A^2_R B^1_R B^2_R \mid C^2_R C^1_R D^2_R D^1_R$.

This is caused by the removal of the redundant data. However, the data gets put into the field memory FIFO buffers 1101 and 1102 in correct order.

Figure 13:
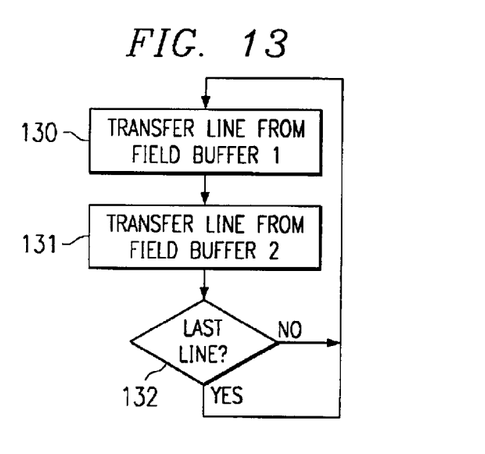
FIG. 13 is a flowchart showing how data is read out of the FIFO field buffers of the reverse 3:2 pull-down multiplexer of FIG. 10.

FIG. 13 is a flowchart for reading data out of the right and left field buffers 110 and 111 into the 3:2 pull-down multiplexer 112. The 24-frame/sec progressive data is read from the right field 1 and right field 2 FIFO buffers 1101, 1102 through multiplexer 1103. Similarly, the 24-frame/sec progressive data is read from the left field 1 and right field 2 FIFO buffers 1104, 1105 through multiplexer 1106. The flowchart applies to both the right and left field buffers 110 and 111. In the flowchart, lines are read in sequence from field buffer 1 block 130 (example: from RFB1 1101) and field buffer 2 block 131 (example: from RFB2 1102). Then decision block 132 determines if this was the last line of video in the frame. If NO (not last video line), the next pair of lines from the two field buffers are read, and so on until decision of block 132 is YES (is last line) at which point the next frame of video readout is started. Relating back to FIG. 11, this relates to alternately reading the RFB1 1101 (example $A^1_R$) and RFB2 1102 (example $A^2_R$) to give a 24-frame/sec progressive frame of video, followed by alternately reading lines from the LFB1 1104 (example $A^1_L$) and LFB2 1105 (example $A^2_L$) to give a second 24-frame/sec frame of progressive video and so on.

Figure 14:
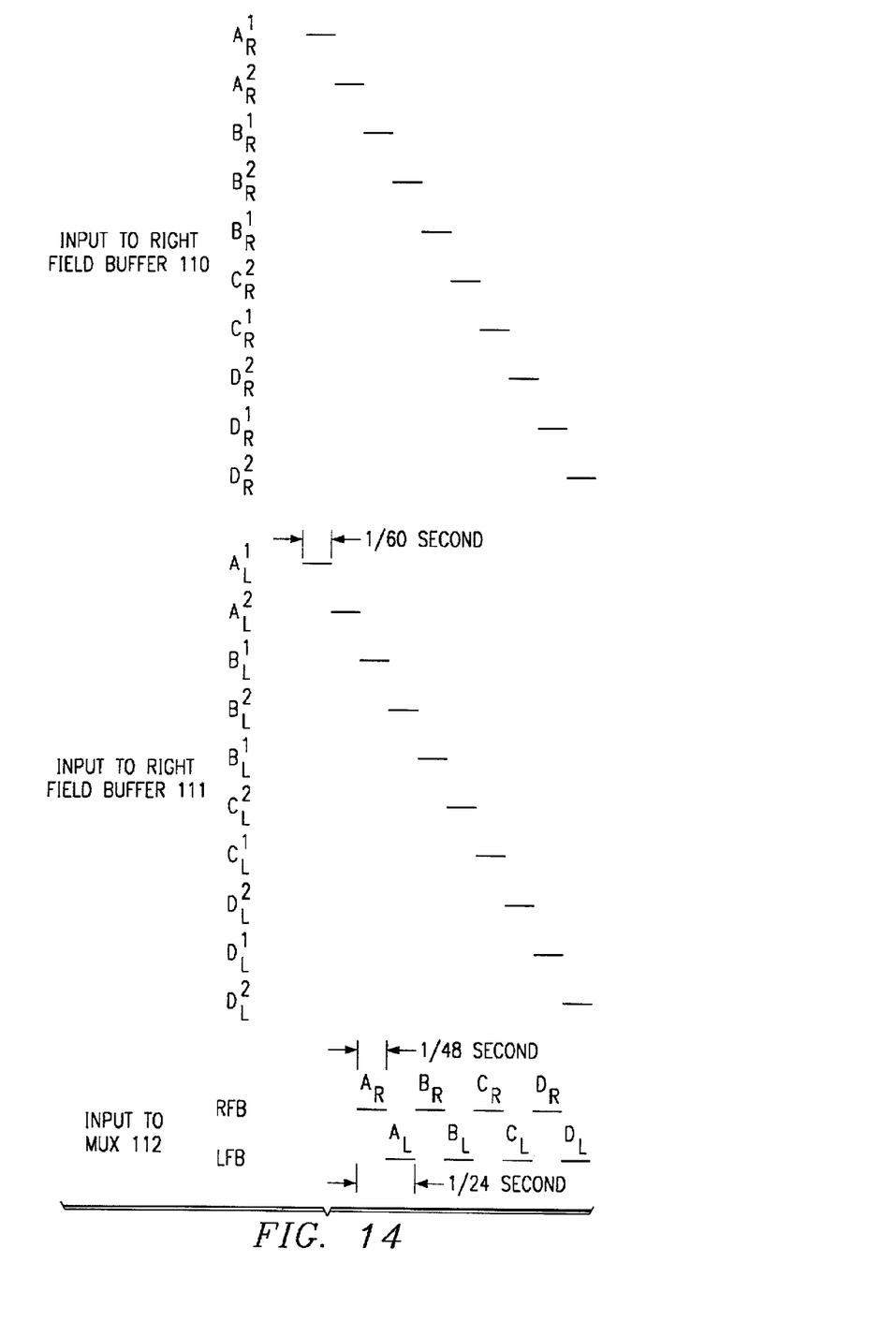
FIG. 14 is a timing diagram for loading and reading out the FIFO field buffers of the reverse 3:2 pull-down multiplexer of FIG. 10.

FIG. 14 is a timing diagram illustrating how data is handled in the playback system of FIG. 9. As shown, data is fed simultaneously into the right and left field buffers 110,111 in phase at $\frac{1}{60}$ sea per field and then read out of the field buffers into multiplexer 112 in a ping-pong fashion at $\frac{1}{48}^{th}$ sec per frame to provide the 48-frame/sec progressive video format of $A_R\ A_L\ B_R\ B_L\ C_R\ C_L\ D_R\ D_L,$ discussed earlier in FIG. 11.

Figure 15:
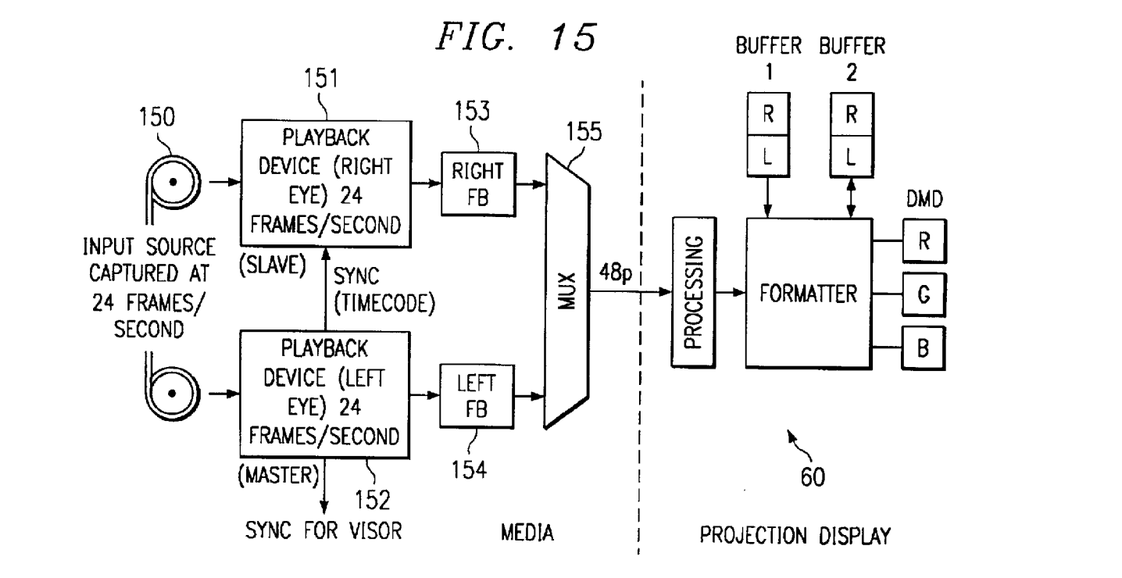
FIG. 15 is a block diagram for the 3-D projection display of this invention with direct playback of video, which has been captured at 24-frames/sec.

There is an ever increasing desire to capture and directly playback 24-frames/sec progressive video through a projection display. FIG. 15 is a block diagram showing the case where 24-frames/sec progressive video is fed directly into the display system. The system consists of the 24-frame/sec input source 150 (media), a right-eye playback device 151, a left-eye playback device 152, a right field buffer 153, a left field buffer 154, a multiplexer 155, and a projection display 60 (from FIG. 6). In comparing FIG. 15 with FIG. 10, it is seen that the reverse 3:2 pull-down multiplexer is no longer required in this case since there is no 60 field/sec interlaced video and as a result the circuitry is simpler and more straightforward. However, the right and left frame buffers 153, 154 and MUX 155 are still required to alternate the 24-frames/sec data and provide the 48-frame/sec progressive video to the projection display system 60.

The descriptions of various embodiments above include assorted means of converting frame rates from a transmitted frame rate to a native frame rate at which the video content was first captured. It should be recognized that coupling the core techniques described herein with some video source eliminates the need for these various video frame rate conversions. For example, one embodiment of the present invention receives data as a dual 24 frame/second video steam (24 first eye and 24 second eye frames per second). The data is stored in the double-buffered memory and read out twice (first-eye, second-eye, first-eye, second-eye) to achieve a 96 frame/second display rate. Likewise, data received at a dual 30 frame/second frame rate can be stored and displayed twice to achieve a 120 frame/second display rate. These various embodiments provide the advantage of producing a high display frame rate without requiring a high bandwidth processor. Data is processed at half the rate at which it is displayed, and merely displayed twice each frame.

While this invention has been described in the context of a preferred embodiment, it will be apparent to those skilled in the art that the present invention may be modified in numerous ways and may assume embodiments other than that specifically set out and described above. Accordingly, it is intended by the appended claims to cover all modifications of the invention that fall within the true spirit and scope of the invention.

What is claimed is:

1. A method of displaying a series of image data frames, each said image data frame comprised of a first-eye frame and a second-eye frame, said method comprising the steps of:

providing a display memory capable of holding two said image data frames comprised of odd and even image lines, a first said image data frame in a first half of said display memory and a second said image data frame in a second half of said display memory;

storing a first said first-eye frame in said first half of said display memory;

storing a first said second-eye frame in said first half of said display memory;

displaying said first said first-eye frame;

displaying said first said second-eye frame;

re-displaying said first said first-eye frame; and re-displaying said first said second-eye frame.

2. The method of claim 1, further comprising the step of:

repeating said displaying and re-displaying steps for a second image data frame in said series.

3. The method of claim 1, further comprising the step of:

receiving said series of image data frames at a 24 Hz frame rate.

4. The method of claim 1, further comprising the step of:

receiving said series of image data frames at a 30 Hz frame rate.

5. The method of claim 1, further comprising the steps of:

receiving said series of image data frames at a 60 Hz interlaced field rate; and converting said received series of image data frames to a 30 Hz non-interlaced frame rate.

6. The method of claim 1, further comprising the step of:

storing said first-eye data in a first-eye portion of said display memory.

7. The method of claim 1 said steps of displaying and re-displaying resulting in a readout sequence of:

first-eye buffer 1;

second-eye buffer 1;

first-eye buffer 1;

second-eye buffer 1;

first-eye buffer 2;

second-eye buffer 2;

first-eye buffer 2; and second-eye buffer 2.

8. The method of claim 1, further comprising the steps of:

receiving dual 60 field/sec interlaced video data; and converting said dual 60 field/second interlaced video data to 48 frame/second progressive-scan series of said image data frames having a sequence of $A_1\ A_2\ B_1\ B_2\ C_1\ C_2\ D_1\ D_2$ using a reverse 3:2 pull-down process prior to said displaying and re-displaying steps.

9. The method of claim 1, further comprising the steps of:

receiving dual 24 frame/sec progressive video data; and converting said dual 24-frame/second progressive video data to 48-frame/second progressive series of said image data frames with a data sequence of $A_1\ A_2\ B_1\ B_2\ C_1\ C_2$ prior to said displaying and re-displaying steps.

10. The method of claim 1, further comprising the step of:

storing said first-eye data in one portion of a double-buffered memory.

11. The method of claim 10 said step of storing said first-eye data in one portion of a double-buffered memory comprising:

storing processed data for a second image data frame in said one portion of said double-buffered memory while data for a first image data frame is being displayed from another portion of said double-buffered memory.

12. The method of claim 11 further comprising the step of:

alternating the storage and display of said data from frame to frame between said one portion and another portion of said double-buffered memory.

13. A display system comprising:

an image processor for receiving and processing image data;

a double-buffered memory electrically connected to said image processor for receiving and storing said processed image data, said double-buffered memory is capable of holding two image data frames, a first said image data frame in a first half of said display memory and a second said image data frame in a second half of said display memory, each of said two image data frames comprised of processed image data for odd and even lines of an image for a first eye and processed image data for odd and even lines of an image for a second eye;

a display device electrically connected to said double-buffered memory for reading said processed image data from said double-buffered memory and displaying said processed image data, said processed image data for a first eye read and displayed during each of two display periods, said two display periods separated by a display period for said processed image data for a second eye.

14. The display system of claim 13 wherein double-buffered memory comprises a pair of right-eye buffers and a pair of left-eye buffers.

15. The display system of claim 13 said data read out of said double-buffered memory in the sequence of:

first eye data from a first portion;

second eye data from said first portion;

first eye data from said first portion;

second eye data from said first portion;

first eye data from a second portion;

second eye data from said second portion;

first eye data from said second portion; and second eye data from said second portion.

16. The display system of claim 13, said data processor converting dual 60 field/second interlaced video data streams to a 48-frames/second progressive video data stream with a data sequence of $A_R A_L B_R B_L C_R C_L D_R D_L$ using a reverse 3:2 pull-down process.

17. The display system of claim 13, said data processor converting dual 24 frame/second progressive data streams to a 48-frames/second progressive video data stream with a a data sequence of $A_1 A_2 B_1 B_2 C_1 C_2 D_1 D_2$.

18. The display system of claim 13 further comprising a viewer device synchronized to said display system.

19. The display system of claim 18, said viewer device comprising a shuttered viewer device.

20. The display system of claim 18, said viewer device comprising a helmet.

21. The display system of claim 18, said viewer device comprising goggles.

22. The display system of claim 18, said viewer device comprising glasses.

23. The display system of claim 18, said viewer device comprising polarized goggles.

24. The display system of claim 18, said viewer device comprising polarized glasses.

25. The display system of claim 13, said image processor storing data in one portion of said double-buffered memory while data is read out of another portion of said double-buffered memory for display.

26. The display system of claim 25, said storing and read out of said data alternating from frame-to-frame between said two portions of said double-buffered memory.

* * * * *